US008253736B2

(12) United States Patent
Adabala et al.

(10) Patent No.: US 8,253,736 B2
(45) Date of Patent: Aug. 28, 2012

(54) REDUCING OCCLUSIONS IN OBLIQUE VIEWS

(75) Inventors: Neeharika Adabala, Bangalore (IN); Kentaro Toyama, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 11/668,382

(22) Filed: Jan. 29, 2007

(65) Prior Publication Data

US 2008/0180439 A1    Jul. 31, 2008

(51) Int. Cl.
 *G06T 15/40*  (2011.01)
 *G06T 15/00*  (2011.01)
(52) U.S. Cl. ........................................ 345/421; 345/419
(58) Field of Classification Search .................. None
 See application file for complete search history.

(56) References Cited

U.S. PATENT DOCUMENTS

| | | | | |
|---|---|---|---|---|
| 5,999,879 | A * | 12/1999 | Yano | 701/208 |
| 6,160,553 | A * | 12/2000 | Robertson et al. | 715/767 |
| 6,271,847 | B1 | 8/2001 | Shum et al. | |
| 6,563,529 | B1 | 5/2003 | Jongerius | |
| 6,710,774 | B1 * | 3/2004 | Kawasaki et al. | 345/419 |
| 6,778,224 | B2 * | 8/2004 | Dagtas et al. | 348/586 |
| 6,914,599 | B1 * | 7/2005 | Rowe et al. | 345/420 |
| 6,973,386 | B2 | 12/2005 | Gibbs | |
| 7,120,293 | B2 | 10/2006 | Schoelkopf et al. | |
| 7,280,105 | B2 * | 10/2007 | Cowperthwaite | 345/419 |
| 7,714,859 | B2 * | 5/2010 | Shoemaker et al. | 345/427 |
| 2003/0014224 | A1 | 1/2003 | Guo et al. | |
| 2003/0164953 | A1 * | 9/2003 | Bauch et al. | 356/611 |
| 2003/0189599 | A1 * | 10/2003 | Ben-Shachar et al. | 345/790 |
| 2004/0239673 | A1 | 12/2004 | Schmidt | |
| 2005/0128197 | A1 | 6/2005 | Thrun et al. | |
| 2005/0238200 | A1 | 10/2005 | Gupta et al. | |
| 2006/0197773 | A1 | 9/2006 | Kraemer | |
| 2006/0221073 | A1 * | 10/2006 | Teler et al. | 345/421 |
| 2009/0079766 | A1 * | 3/2009 | Dolph et al. | 345/660 |
| 2009/0110239 | A1 * | 4/2009 | Chen et al. | 382/103 |

FOREIGN PATENT DOCUMENTS

WO    WO 2006/072255    7/2006

OTHER PUBLICATIONS

"The Library of Congress Panoramic Maps Collection," http://memory.loc.gov/ammem/pmhtml/panhome.html.

Buchholz, Henrik et al., "Real-Time Non-Photorealistic Rendering of 3D City Models," Hasso-Plattner-Institute at the University of Potsdam, In Proceedings of the 1st International Workshop on Next Generation 3D City Models, 2005.

Bullock, David and John Zelek, "Real-Time Tracking for Visual Interface Applications in Cluttered and Occluding Situations," http://www.cipprs.org/vi2002/pdf/s2-3.pdf.

(Continued)

*Primary Examiner* — Daniel Hajnik
(74) *Attorney, Agent, or Firm* — Perkins Cole LLP (57) ABSTRACT

An occlusion reduction system is described. The occlusion reduction system can reduce occlusions when displaying multiple objects by computing an occlusion measure and applying one or more functional dynamics techniques to minimize the occlusion measure, such as by moving objects, making objects at least partially transparent, and altering the scale of objects. The occlusion reduction system can create a geometric model based on modeling information it receives, establish a viewpoint, identify a set of objects for analysis, and compute an occlusion measure for the identified set of objects.

29 Claims, 10 Drawing Sheets

OTHER PUBLICATIONS

Cohen-Or, Daniel et al., "A Survey of Visibility for Walkthrough Applications," IEEE Transactions on Visualization and Computer Graphics, vol. 9, No. 3, Jul.-Sep. 2003, pp. 412-431, © 2003 IEEE.

Dollner, Jurgen and Maike Walther, "Real-Time Expressive Rendering of City Models," Proceedings of the Seventh International Conference on Information Visualization, © 2003 IEEE.

Durand, Fredo et al., "Fast and Accurate Hierarchical Radiosity Using Global Visibility," ACM Transacations on Graphics. (18)2:128-170, 1999.

Durand, Fredo, "3D Visibility: Analytical Study and Applications," PhD Thesis, Universite Grenoble I—Joseph Fourier Sciences et Geographie, Jul. 1999.

Durand, Fredo, "A multidisciplinary survey of visibility," in ACM SIGGRAPH 2000 course notes on Visibility, Extract of the PhD dissertation 3D Visibility: Analytical Study and Applications, Jul. 2000.

Hu, Jinhui, Suya You and Ulrich Neumann, "Approaches to Large-Scale Urban Modeling," Survey, Nov./Dec. 2003, IEEE Computer Graphics and Applications, pp. 62-69, © 2003 IEEE.

Lee, D. T. and Arthur K. Lin, "Computational Complexity of Art Gallery Problems," IEEE Transactions on Information Theory, vol. 32, No. 2, Mar. 1986, pp. 276-282, © 1986 IEEE.

Lengyel, Jed et al., "Real-Time Robot Motion Planning Using Rasterizing Computer Graphics Hardware," SIGGRAPH '90, Proceedings of the 17th Annual Conference on Computer Graphics and Interactive Techniques, pp. 327-335, New York, 1990, ACM Press.

Lowe, David G., "Distinctive Image Features from Scale-Invariant Keypoints," Jan. 5, 2004, International Journal of Computer Vision, 2004, http://www.cs.ubc.ca/~lowe/papers/ijcv04.pdf.

Parish, Yoav I H and Pascal Muller, "Procedural Modeling of Cities," SIGGRAPH'01, Proceedings of the 28th Annual Conference on Computer Graphics and Interactive Techniques, pp. 301-308, New York, 2001, ACM Press.

Rosenholtz, Ruth et al., "Feature Congestion: A Measure of Display Clutter," CHI 2005, Apr. 2-7, 2005, Portland, Oregon, © 2005 ACM.

Vazquez, Pere-Pau et al., "Viewpoint Selection using Viewpoint Entropy," VMV 2001, Stuttgart, Germany, Nov. 21-23, 2001, pp. 273-280.

Wonka, Peter and Dieter Schmalstieg, "Occluder Shadows for Fast Walkthroughs of Urban Environments," EUROGRAPHICS'99, vol. 18, No. 3, 1999, © The Eurographics Association and Blackwell Publishers 1999.

Yi, Seungku et al., "Automatic Sensor and Light Source Positioning for Machine Vision," Proceedings of the 10th International Conference on Pattern Recognition, pp. 55-59, © 1990 IEEE.

Bullock, David and John Zelek, "Real-Time Tracking for Visual Interface Applications in Cluttered and Occluding Situations," Oct. 2004, http://www.cipprs.org/vi2002/pdf/s2-3.pdf (8 pgs.).

"The Library of Congress Panoramic Maps Collection," Oct. 19, 1998, http://memory.loc.gov/ammem/pmhtml/panhome.html (2 pgs.).

\* cited by examiner

*FIG. 9B* ic model based on modeling information it receives, establish a viewpoint, identify a set of objects for analysis, and compute an occlusion measure for the identified set of objects. When the computed occlusion measure exceeds a threshold occlusion value, the functional dynamics system can iteratively apply functional dynamics techniques to displayed objects and re-compute the occlusion measure until the occlusion measure does not exceed the threshold occlusion value.

REDUCING OCCLUSIONS IN OBLIQUE VIEWS

BACKGROUND

Information is sometimes displayed graphically to users. Examples of graphically displayed information include charts, histograms, diagrams, and maps. When a lot of information is displayed graphically, such as in a confined space, the display can become cluttered and some of the displayed information can occlude (e.g., obstruct) other information. This occlusion is commonly visible in some maps. As an example, when a map shows streets, labels, buildings, geographical areas, and other map features, these features can become cluttered and various map features can occlude other map features, such as when the map is displayed on a computer display or on paper. As an example, a label for a geographic area can occlude another map feature.

An example of a type of map is a panoramic map that displays an urban area in an "oblique" view. These oblique panoramic urban maps display an urban area from an oblique angle, such as at an angle other than ninety degrees, which is the angle commonly employed for maps. At ninety degrees, the viewpoint of a map is from directly above the mapped features. Conversely, an oblique angle offers an angular viewpoint that is between zero degrees and ninety degrees. Using this oblique angle when drawing a panoramic urban map, the cartographer commonly illustrates significant objects on the map, such as buildings, bridges, fountains, large trees, etc., in addition to streets and street labels.

Cartographers in the 16th to early 19th centuries commonly employed oblique panoramic urban maps to illustrate urban areas. These maps made it easy for viewers to recognize landmark objects. However, the use of such maps disappeared with time as creating these types of maps involved extensive manual effort by skilled cartographers. Moreover, modern urban areas make such maps difficult to produce and use because of the large number of objects that need to be included to make the map representative of modern urban areas.

With the advent of modern technology, detailed modeling information is now available for many urban areas. Modeling information includes measurements and relative positions of objects in an area. Advances in computer graphics and visualization techniques have made it easier to create panoramic maps using this modeling information without the expense of sophisticated manual labor of cartographers. However, when the urban area that is being mapped has a large number of objects (e.g., a downtown area with many skyscrapers), many objects can occlude other objects. As examples, a large skyscraper that appears between a viewpoint from which the map is drawn and a smaller building may completely occlude the smaller building, adjacent buildings may occlude a structure behind them, etc.

SUMMARY

An occlusion reduction system is described that attempts to generate an oblique panoramic view of objects while minimizing the occlusion of these objects. The occlusion reduction system can reduce occlusions when displaying multiple objects by computing an occlusion measure and applying one or more functional dynamics techniques to minimize the occlusion measure, such as by moving objects, making objects at least partially transparent, and altering the scale of objects. The occlusion reduction system can create a geometric model based on modeling information it receives, estab- This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An occlusion reduction system is described that attempts to generate an oblique panoramic view of objects while minimizing the occlusion of these objects. In various embodiments, the occlusion reduction system reduces occlusions when displaying multiple objects by computing an occlusion measure and applying one or more functional dynamics techniques to minimize the occlusion measure, such as by moving objects, making objects at least partially transparent, and altering the scale of objects. In various embodiments, the occlusion reduction system creates a geometric model based on modeling information it receives, establishes a viewpoint (e.g., based on a user indication of a perspective from which the geometric model is to be displayed or by applying various strategies for selecting a viewpoint), identifies a set of objects for analysis, and computes an occlusion measure for the identified set of objects. The set of objects for analysis can be based on a selection of objects that can be displayed given the established viewpoint and a scaling factor. As an example, at a specified scaling factor, the display screen or printed page can display an identifiable set of objects because the display screen or page has a known size (e.g., number of pixels).

The occlusion reduction system reduces occlusions by computing an occlusion measure and attempting various techniques to reduce the occlusion measure. The occlusion measure is a measure of the extent to which the identified set of objects is obscured. An example of an occlusion measure is an occlusion index. Although the occlusion reduction system is described herein as employing an occlusion index, it can employ other occlusion measures. In some embodiments, the occlusion reduction system calculates the occlusion index, O, as follows:

$$O=\Sigma_i o_i$$

where $$o_i=\Sigma_{j(j\ne i)} \text{BlkFrac}_{ij}$$

and $\text{BlkFrac}_{ij}$ is the fraction of the potentially visible area of object i that is blocked by object j. The potentially visible area of an object is the portion of the object that, based on the established viewpoint, would be visible but for the occlusion.

To determine whether an object occludes another object, the occlusion reduction system can employ the bounding boxes of both objects. A bounding box of an object is a three-dimensional rectangular box that encompasses the object. As an example, the bounding box of a pyramid would be a rectangular three-dimensional box covering the entire pyramid's height and base, including vacant spaces between the edges of the pyramid and the edges of the bounding box. In some embodiments, the occlusion reduction system can employ two different bounding boxes for different types of calculations. As an example, when a building has a rectangular lower section and a tapered (e.g., pyramidal) upper section, the occlusion reduction system can employ a bounding box encompassing just the lower rectangular section when checking that building's visibility but can employ a bounding box covering both the lower rectangular section and the upper pyramidal section when checking whether that building occludes another building. The occlusion reduction system employs these two different bounding boxes to avoid erroneous results that could be caused by the tapered pyramidal section of the building. As an example, when a tapered portion of a building is visible but not its rectangular lower portion, using a bounding box for the entire building to check visibility, and not just the lower rectangular portion, could falsely indicate that a greater extent of the building is visible because the bounding box has a greater surface area than the tapered building. On the other hand, the occlusion reduction system may employ the bounding box for the entire building to check whether the building occludes others because that would provide a more conservative figure than just employing the bounding box of the lower rectangular portion.

Upon determining that the occlusion index exceeds an identified threshold value (e.g., 50%), the occlusion reduction system can apply one or more functional dynamics techniques and re-check the occlusion index. The occlusion reduction system can repeat this process iteratively until arriving at a sufficiently low occlusion index or inability to further apply functional dynamics techniques. Three functional dynamics techniques will now be described, though the occlusion reduction system is capable of adding additional techniques. In some embodiments, the occlusion reduction system combines multiple functional dynamics techniques.

As a first functional dynamics technique, the occlusion reduction system can move an object to increase its visibility or the visibility of another object that the moved object occludes. As an example, the occlusion reduction system can move a building from its original position to make it more visible or to make another object the building occludes more visible. The occlusion reduction system can apply various constraints to the extent to which an object may move. As examples of constraints, an object cannot change its position relative to other objects (e.g., a building cannot change its position relative to roads and an object that is to the left of an object cannot be moved to the right of that object), an object cannot move more than a specified distance, etc. By moving an object, some occlusions may be diminished.

As a second functional dynamics technique, the occlusion reduction system can make an object at least partially transparent. As an example, the occlusion reduction system can make objects that occlude other objects ("occluding objects") transparent. In some embodiments, the occlusion reduction system makes objects that are closest to the viewpoint more transparent than objects that are closer to the occluded object. When an object becomes transparent, its contribution to the occlusion index is reduced. As an example, a completely transparent object contributes zero to the occlusion index. The occlusion reduction system can employ various levels of transparency and colors. The occlusion reduction system can compute whether an object is occluded (or is occluding) by more than some threshold, such as 50%. If so, the occlusion reduction system can apply a transparency transformation to the occluding object.

As a third functional dynamics technique, the occlusion reduction system can apply a non-uniform scaling factor to an object. The occlusion reduction system can scale an occluded or occluding object to make an object less occluded. As examples, the occlusion reduction system can make an occluded short building taller to make it visible or can make an occluding tall building shorter to make an occluded building behind it visible. This technique may be employed where scaling accuracy is unimportant or where aesthetics are more important. When shorter buildings appear in front of taller buildings, the occlusion index reduces. In some embodiments, the scale may be applied disproportionately, such as in height or width.

In some embodiments, the occlusion reduction system can select an optimal viewpoint by rotating through viewpoints, e.g., through 360° horizontally and 90° vertically, to determine a viewpoint that provides the lowest occlusion index. The occlusion reduction system can apply this technique in addition to applying one or more functional dynamics techniques.

In some embodiments, the occlusion reduction system can employ time as a domain to vary the graphical display. As an example, the occlusion reduction system can animate the displayed information over time. In some embodiments, the occlusion reduction system can select for display objects based on their functions, such as banks, residential buildings, etc.

Figure 1A:
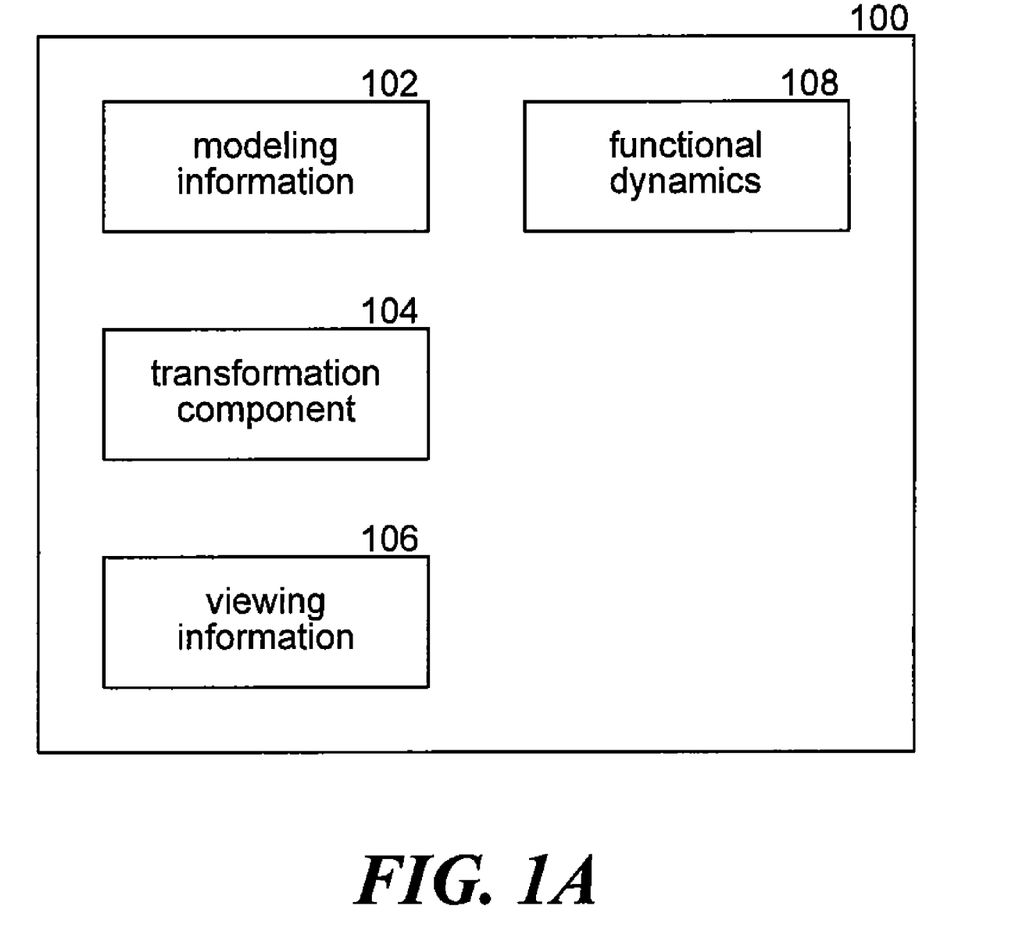
FIG. 1A is a block diagram illustrating an occlusion reduction system in some embodiments.

Several embodiments of the occlusion reduction system are described in more detail in reference to the Figures. FIG. 1A is a block diagram illustrating an occlusion reduction system in some embodiments. The occlusion reduction system can be implemented by a computing system comprising one or more computing devices. The computing devices on which the occlusion reduction system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the occlusion reduction system. In addition, the data structures and message structures may be stored or transmitted via a data transmission medium, such as a signal on a communications link. Various communications links may be used, such as the Internet, a local area network, a wide area network, or a point-to-point dial-up connection.

The occlusion reduction system may use various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The occlusion reduction system may also provide its services to various computing systems, such as personal computers, cell phones, personal digital assistants, consumer electronics, home automation devices, and so on.

The occlusion reduction system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The occlusion reduction system 100 includes modeling information 102, a transformation component 104, viewing information 106, and a functional dynamics component 108.

The modeling information includes information that can be employed to create a model of the objects that are to be displayed. As an example, the modeling information can include information pertaining to buildings, roads, bridges, fountains, and other objects associated with an urban area. In a mapping context, the modeling information can include vector and other information that can be used to display objects and derive relationships between the objects, such as building dimensions, road features, and so forth.

The transformation component can transform data from one form into another. The transformation component can transform modeling information into a geometric model. A geometric model is a geometric set of descriptions of objects, and can be represented using scalars, vectors, etc. Graphical systems commonly employ geometric models to represent object surfaces, such as by employing meshes of triangles. Geometric models are generally represented using an internal coordinate system that is independent of display devices. Upon receiving an identified viewpoint, the transformation component can also transform the geometric model into viewing information that can be employed to display objects.

Viewing information is information that the occlusion reduction system, or indeed other graphical systems, can use to render information visually, such as on a computer display or printer. The viewing information is sometimes represented in screen or printer coordinates.

The functional dynamics component applies one or more functional dynamics techniques to the viewing information, such as to reduce or minimize an occlusion index. In some embodiments, the functional dynamics component computes the occlusion index, determines whether the occlusion index exceeds a threshold occlusion value, and when the occlusion index exceeds the threshold occlusion value, improves visibility of the occluded objects by applying one or more functional dynamics techniques.

Figure 1B:
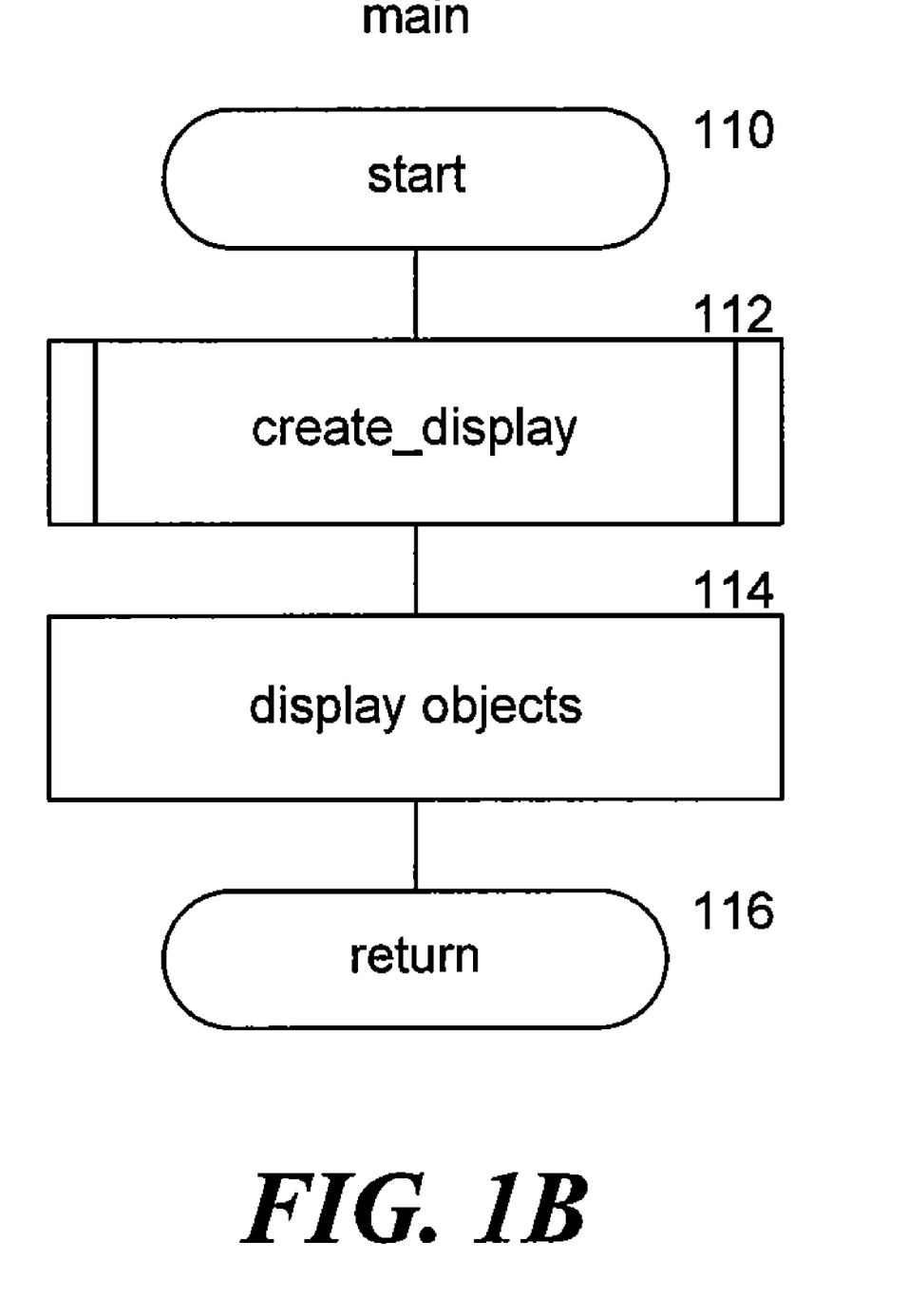
FIG. 1B is a flow diagram illustrating a main routine invoked by the occlusion reduction system in some embodiments.

FIG. 1B is a flow diagram illustrating a main routine invoked by the occlusion reduction system in some embodiments. The occlusion reduction system can invoke the routine when it starts. The routine begins at block 110. At block 112, the routine invokes a create_display subroutine to create a display of objects (e.g., on a computer screen or on a printed page). The create_display subroutine is described below in relation to FIG. 2. At block 114, the routine displays objects, such as on a computer screen, printed page, or other output device. At block 116, the routine returns.

Those skilled in the art will appreciate that the logic illustrated in FIG. 1B and described above, and in each of the flow diagrams discussed below, may be altered in a variety of ways. For example, the order of the logic may be rearranged, substeps may be performed in parallel, illustrated logic may be omitted, other logic may be included, etc.

Figure 2:
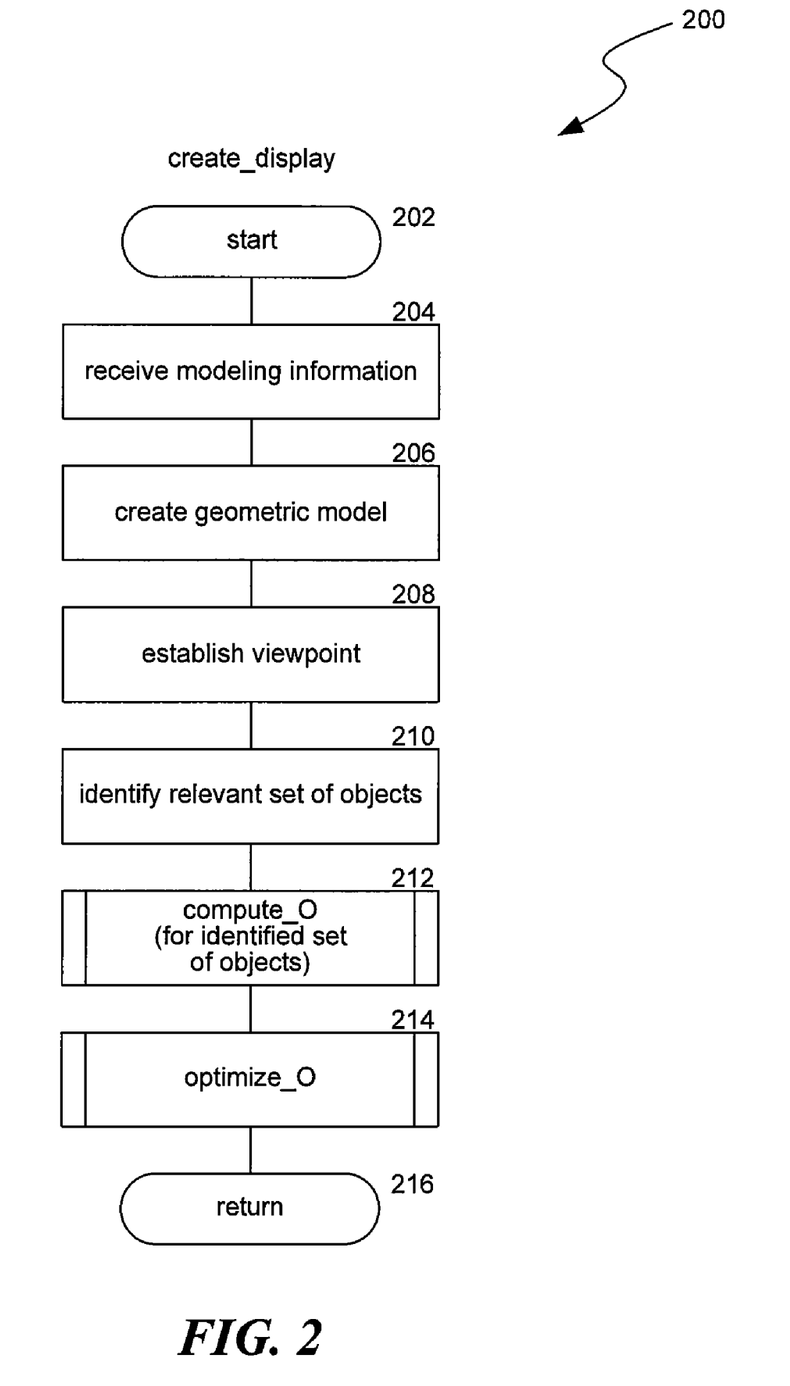
FIG. 2 is a flow diagram illustrating a create_display routine invoked by the occlusion reduction system in some embodiments.

FIG. 2 is a flow diagram illustrating a create_display routine invoked by the occlusion reduction system in some embodiments. The occlusion reduction system invokes the create_display routine 200 to create a display based on modeling information. The routine begins at block 202.

At block 204, the routine receives modeling information. In some embodiments, the routine may retrieve modeling information, such as from a database. At block 206, the routine transforms the modeling information to create a geometric model. The geometric model defines the set of objects that can be displayed.

At block 208, the routine establishes a viewpoint. The routine can receive an indication of a viewpoint from a user. As an example, a user can manipulate a visualization application via a user interface to indicate a viewpoint. Alternatively, the occlusion reduction system can select a viewpoint that causes the fewest occlusions (e.g., results in the lowest occlusion index).

At block 210, the routine employs the established viewpoint to identify a relevant set of objects. As an example, the routine can identify all objects that can be displayed on a screen or on paper based on the size of the screen or paper, the established viewpoint, and a selected scale.

At block 212, the routine invokes a compute_O subroutine to compute the occlusion index for the identified set of objects. The compute_O subroutine is described in further detail below in relation to FIG. 3.

At block 214, the routine invokes an optimize_O subroutine to optimize the occlusion index. The optimize_O subroutine is described in further detail below in relation to FIG. 4.

At block 216, the routine returns.

Figure 3:
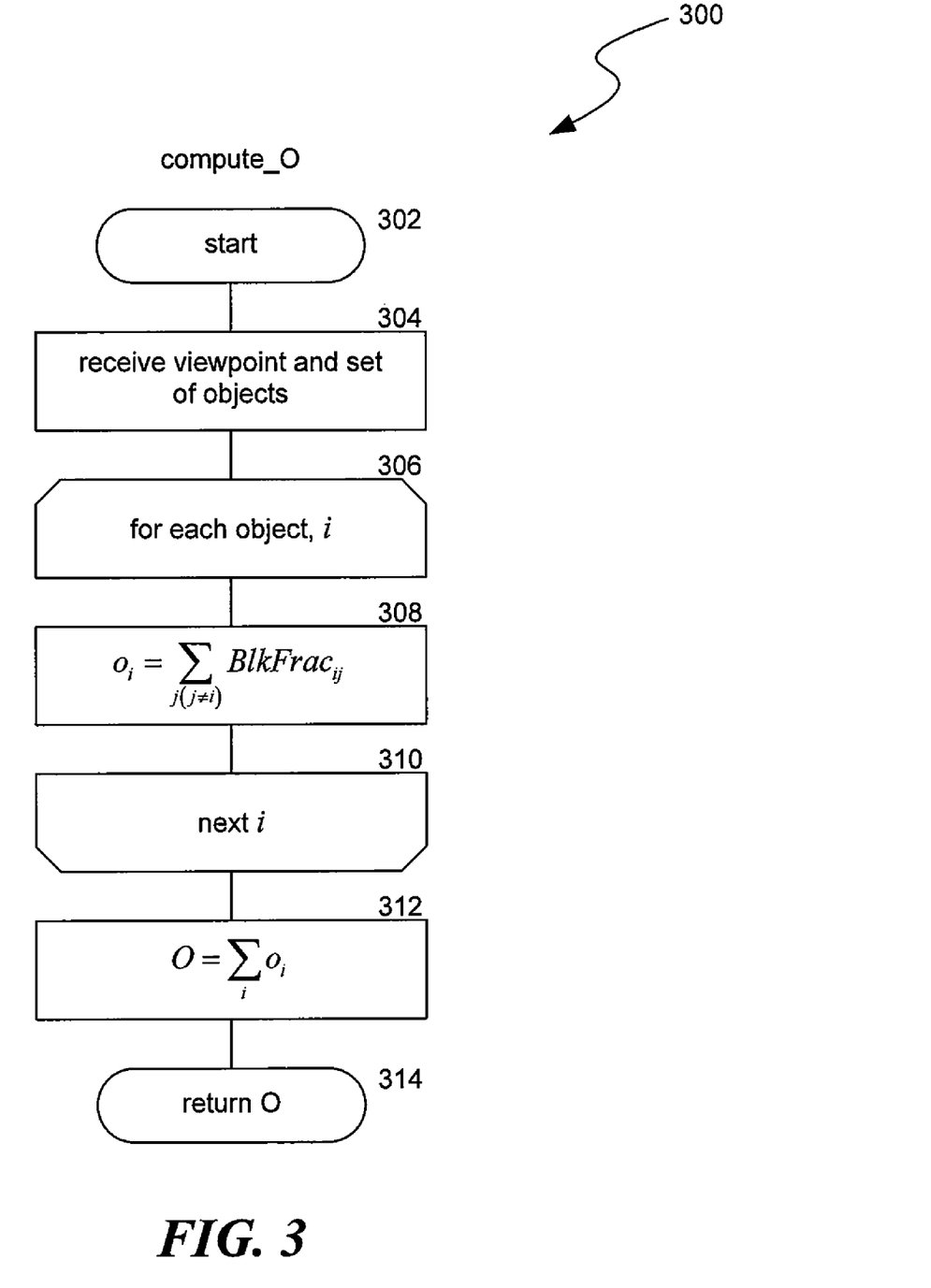
FIG. 3 is a flow diagram illustrating a compute_O routine invoked by the occlusion reduction system in some embodiments.

FIG. 3 is a flow diagram illustrating a compute_O routine invoked by the occlusion reduction system in some embodiments. The occlusion reduction system can invoke the compute_O routine 300 to compute an occlusion index for a set of objects based on a specified viewpoint. The routine begins at block 302.

At block 304, the routine receives an established viewpoint and a set of objects. As an example, the routine receives the viewpoint and set of objects identified by the create_display routine, which is described above in relation to FIG. 2.

Within the loop of blocks 306-310, the routine computes an occlusion value for each object in the received set of objects. At block 306, the routine selects an object. At block 308, the routine sets the occlusion value, $o_i$, for the selected object, i, as follows:

$$o_i = \Sigma_{j(j \neq i)} \text{BlkFrac}_{ij}$$

where the sum provides the fraction of the selected object that is occluded by all other objects in the received set of objects. As discussed above, $\text{BlkFrac}_{ij}$ is the fraction of the potentially visible area of object i that is blocked by object j. The occlusion reduction system can compute $\text{BlkFrac}_{ij}$ for each i and j by analyzing, with respect to the received viewpoint, how much of object i is blocked by object j, such as by applying transformations of viewpoint information. At block 310, the routine selects another object. When all objects have been processed, the routine continues at block 308. Otherwise, the routine continues at block 312.

At block 312, the routine computes the occlusion index. In some embodiments, the occlusion index is computed by summing all computed occlusion values:

$$O = \Sigma_i o_i$$

At block 314, the routine returns the computed occlusion index.

Figure 4:
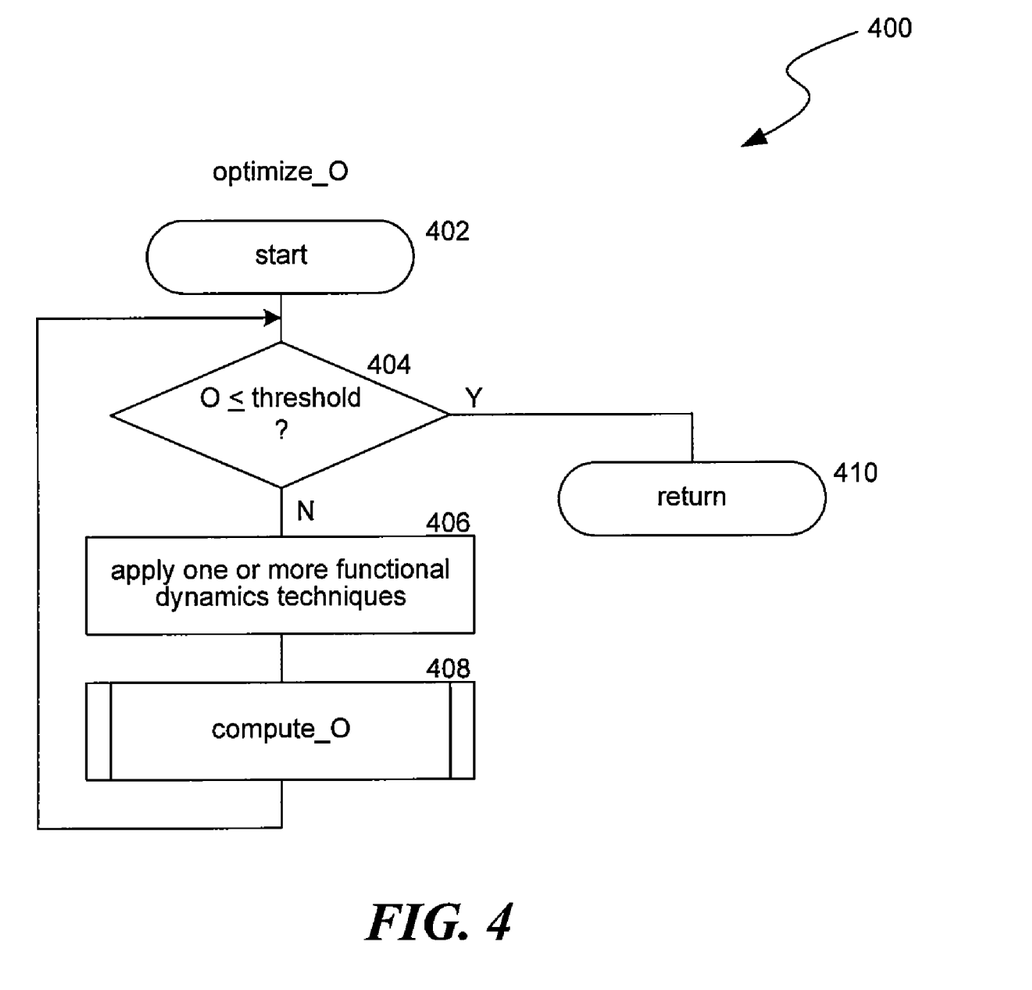
FIG. 4 is a flow diagram illustrating an optimize_O routine invoked by the occlusion reduction system in some embodiments.

FIG. 4 is a flow diagram illustrating an optimize_O routine invoked by the occlusion reduction system in some embodiments. The optimize_O routine 400 can optimize an occlusion index, such as by applying one or more functional dynamics techniques. The routine begins at block 402.

At decision block 404, the routine determines whether the computed occlusion index is less than or equal to a threshold occlusion value. As an example, the routine may receive the occlusion index computed by the compute_O routine described above in relation to FIG. 3. If the occlusion index is less than or equal to a threshold occlusion value, the routine continues at block 410, where it returns. Otherwise, the routine continues at block 406.

At block 406, the routine applies one or more functional dynamics techniques, such as to move objects, apply transparencies to objects, or scale objects. These techniques are described in further detail below in relation to FIGS. 5-7. If the occlusion reduction system cannot apply any more functional dynamics techniques, such as because all objects have been moved, scaled, or re-colored, the routine continues at block 410, where it returns.

At block 408, the routine computes a resulting occlusion index after applying the functional dynamics techniques. The routine then continues at decision block 404.

Figure 5:
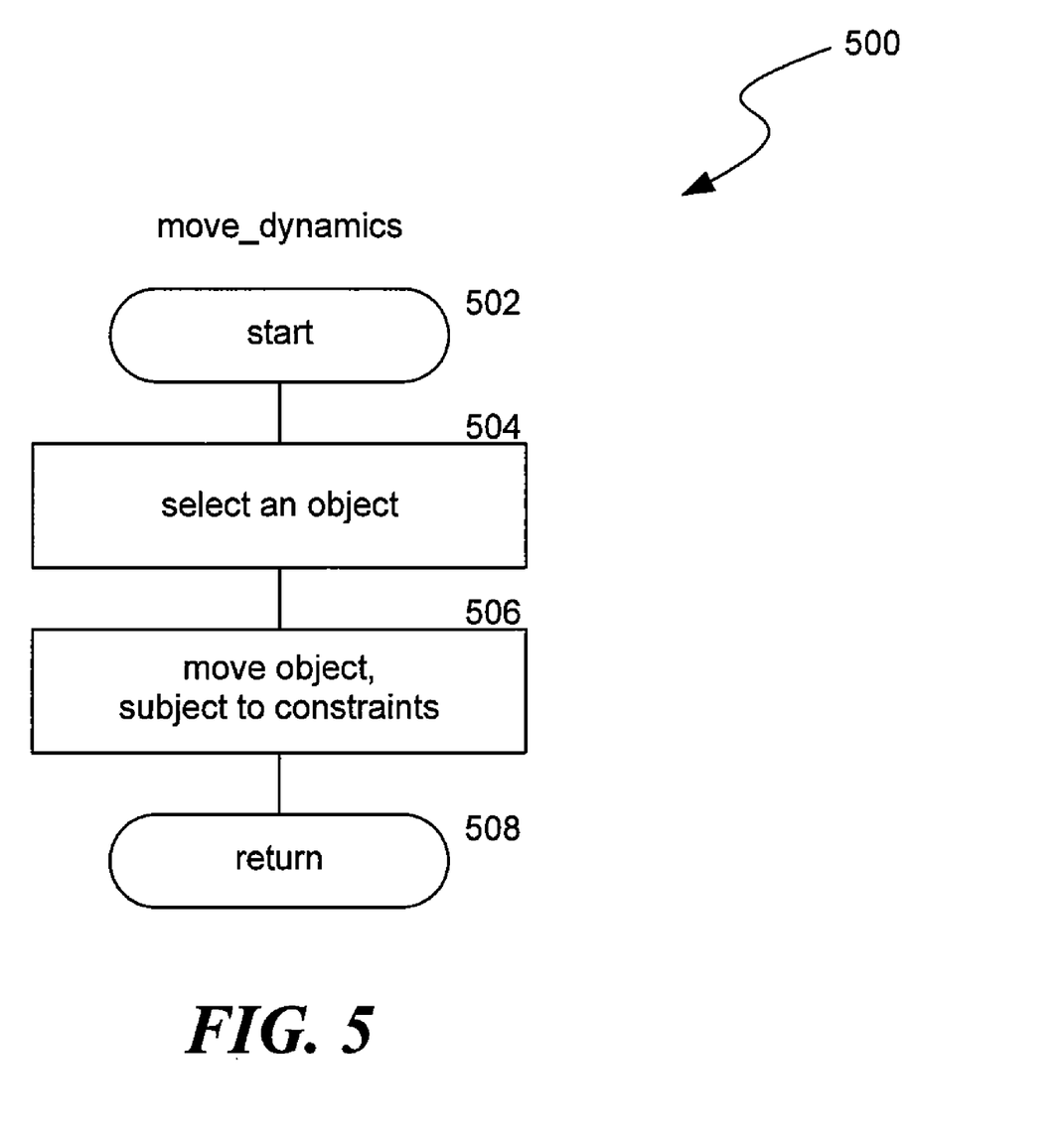
FIG. 5 is a flow diagram illustrating a move_dynamics routine invoked by the occlusion reduction system in some embodiments.
Figure 6:
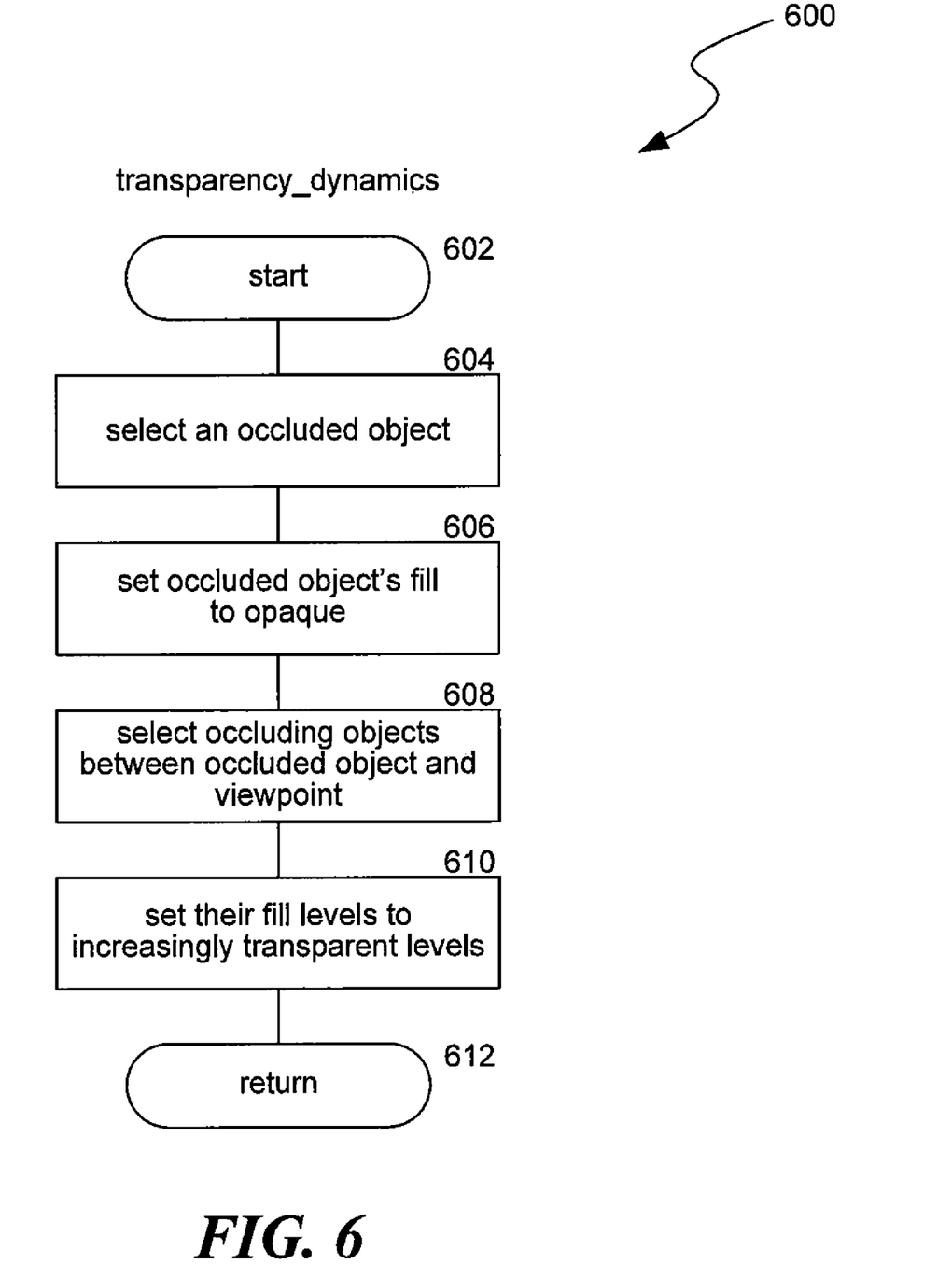
FIG. 6 is a flow diagram illustrating a transparency_dynamics routine invoked by the occlusion reduction system in some embodiments.
Figure 7:
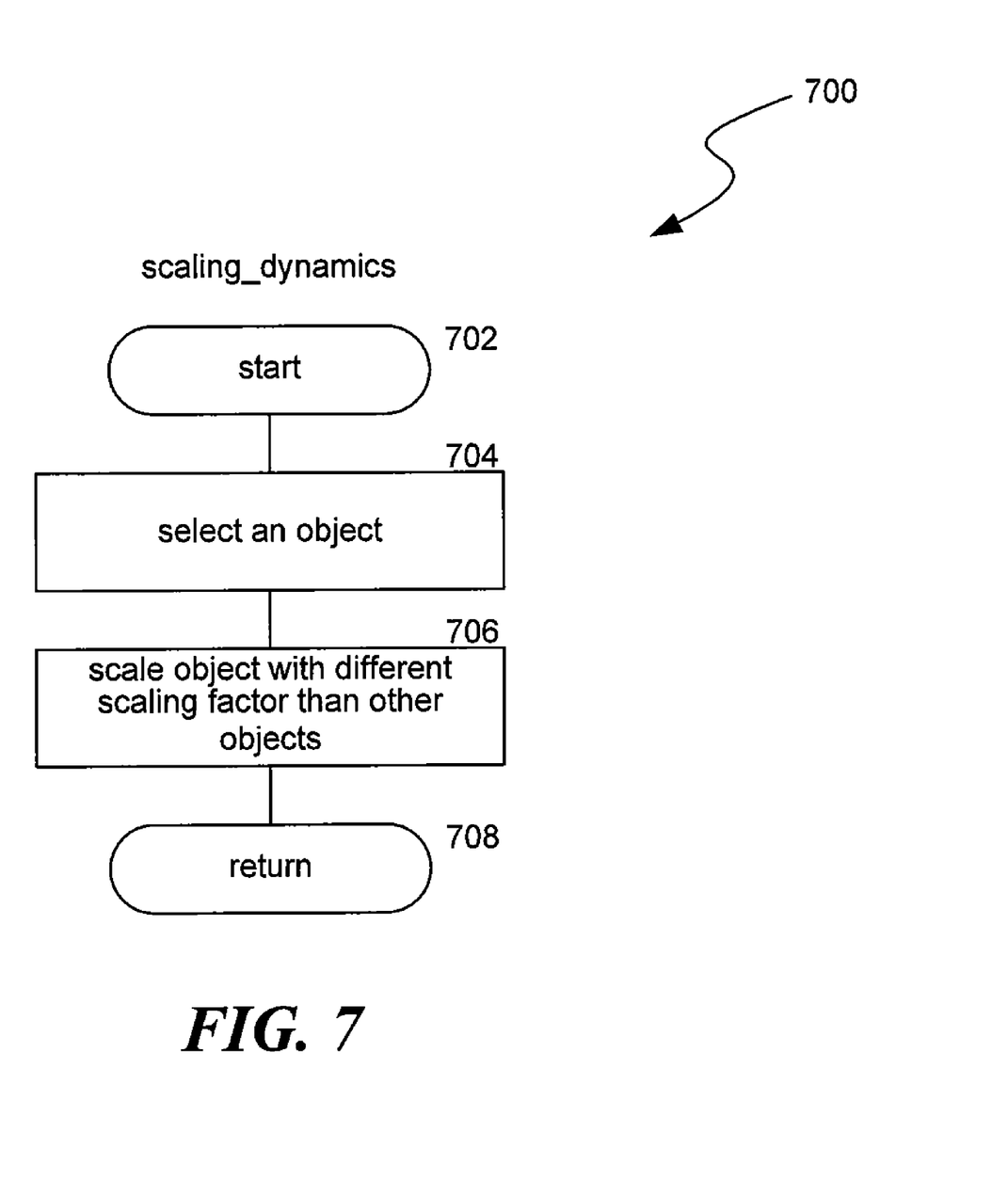
FIG. 7 is a flow diagram illustrating a scaling_dynamics routine invoked by the occlusion reduction system in some embodiments.

FIGS. 5-7 illustrate various functional dynamics techniques invoked by the occlusion reduction system in various embodiments. Although the illustrated routines apply a particular technique once, they may apply the technique multiple times, such as once for each object, to reduce the occlusion index. The occlusion reduction system can also invoke the routines multiple times.

FIG. 5 is a flow diagram illustrating a move_dynamics routine invoked by the occlusion reduction system in some embodiments. The occlusion reduction system can invoke the move_dynamics routine 500 to move objects. The routine begins at block 502. In various embodiments, the routine may receive indications of an established viewpoint and displayed objects. At block 504, the routine selects an object. As an example, a caller of the routine (e.g., another routine, such as the optimize_O routine) may provide an indication of an object that the move_dynamics routine is to select. Alternatively, the routine may select an object randomly or an object that has the greatest occlusion value. In various embodiments, the routine selects an occluding object or an occluded object. At block 506, the routine moves the selected object, subject to various constraints. In various embodiments, the occlusion reduction system may store the constraints as rules, such as in a table or database. The following may be examples of constraints: do not move an object beyond a specified distance; do not move a building across a street; and do not change the relative positions of objects. At block 508, the routine returns.

FIG. 6 is a flow diagram illustrating a transparency_dynamics routine invoked by the occlusion reduction system in some embodiments. The occlusion reduction system can invoke the transparency_dynamics routine 600 to cause some objects to be displayed with a transparent shading. The transparency can be fully transparent (e.g., clear), partially transparent, or fully opaque. The routine begins at block 602. In various embodiments, the routine may receive indications of an established viewpoint and displayed objects.

At block 604, the routine selects an occluded object. As an example, a caller of the routine (e.g., another routine, such as the optimize_O routine) may provide an indication of an object that the transparency_dynamics routine is to select. Alternatively, the routine may select an object randomly or an object that has the greatest occlusion value.

At block 606, the routine sets the selected object's fill value to opaque. By setting the object's fill value to opaque, the occlusion reduction system can display the selected object opaquely.

At block 608, the routine selects occluding objects between the occluded object and the established viewpoint. In various embodiments, the routine may select one, some, or all occluding objects.

At block 610, the routine sets the fill values of the selected objects to various transparency levels. In an embodiment, the routine sets the fill values to increasingly transparent levels whereby the occluding object closest to the viewpoint is made completely transparent and other occluding objects are given less transparency as they approach the occluded object.

At block 612, the routine returns.

FIG. 7 is a flow diagram illustrating a scaling_dynamics routine invoked by the occlusion reduction system in some embodiments. The occlusion reduction system can invoke the scaling_dynamics routine 700 to cause some objects to be scaled non-uniformly in comparison to other displayed objects. The routine begins at block 702. In various embodiments, the routine may receive indications of an established viewpoint and displayed objects. At block 704, the routine selects an object. As an example, a caller of the routine (e.g., another routine, such as the optimize_O routine) may provide an indication of an object that the scaling_dynamics routine is to select. Alternatively, the routine may select an object randomly or an object that has the greatest occlusion value. In various embodiments, the routine selects an occluding object or an occluded object. At block 706, the routine scales the selected object with a different scaling factor than other nearby objects that are displayed. In various embodiments, the routine may scale in one dimension of the selected object but not another, such as the object's height or width alone. At block 708, the routine returns.

Figure 8A:
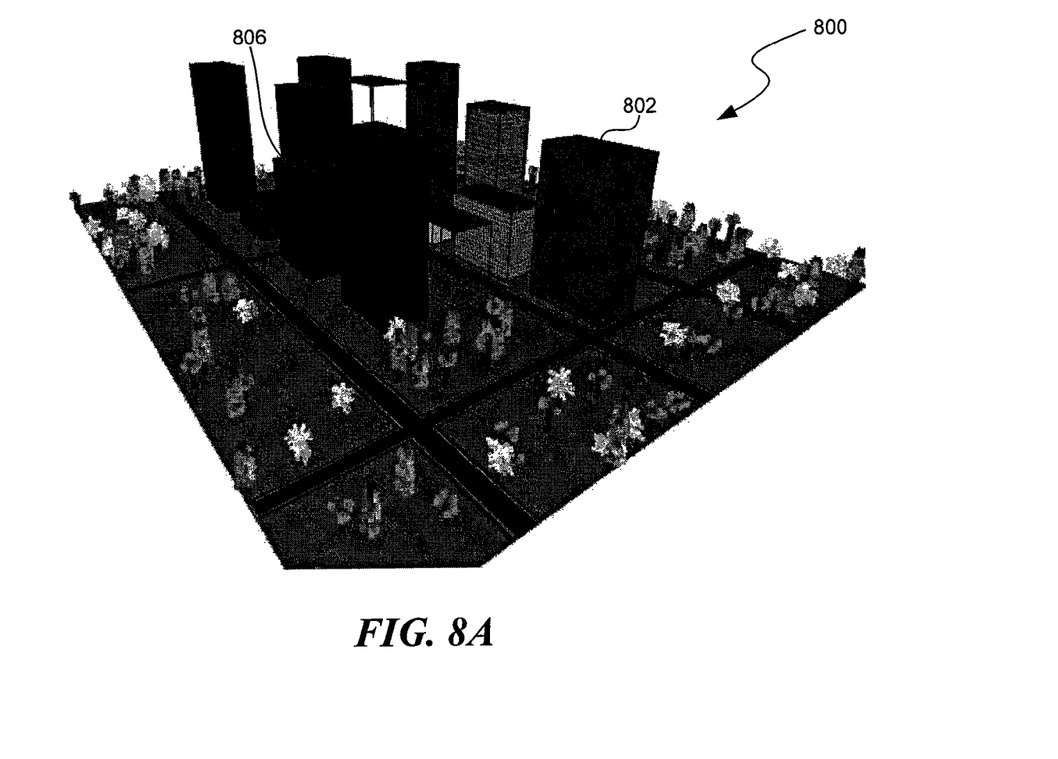
FIGS. 8A and 8B are image diagrams illustrating application of transparency functional dynamics in some embodiments.
Figure 8B:
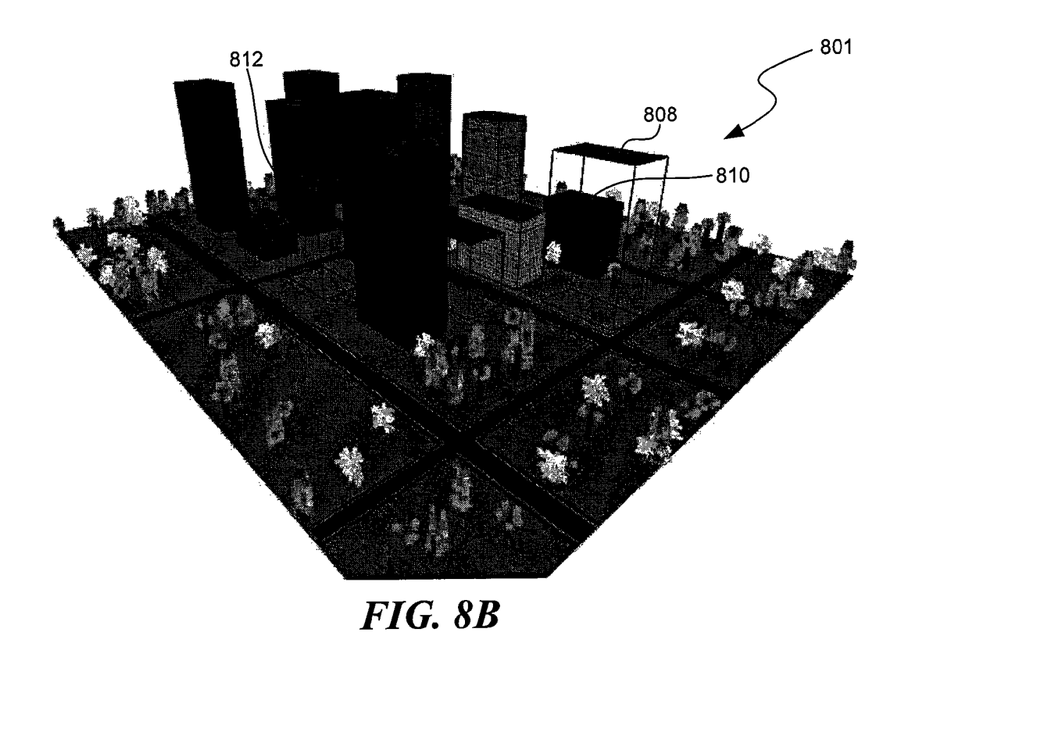

FIGS. 8A and 8B are image diagrams illustrating application of transparency functional dynamics in some embodiments. In FIG. 8A, a view 800 displays opaque buildings 802 and 806. The occlusion reduction system can cause these buildings to be transparent, such as to display other buildings. As an example, in view 801 of FIG. 8B, building 808 depicts a transparent version of building 802 to display building 810 that appears behind building 808.

Figure 9A:
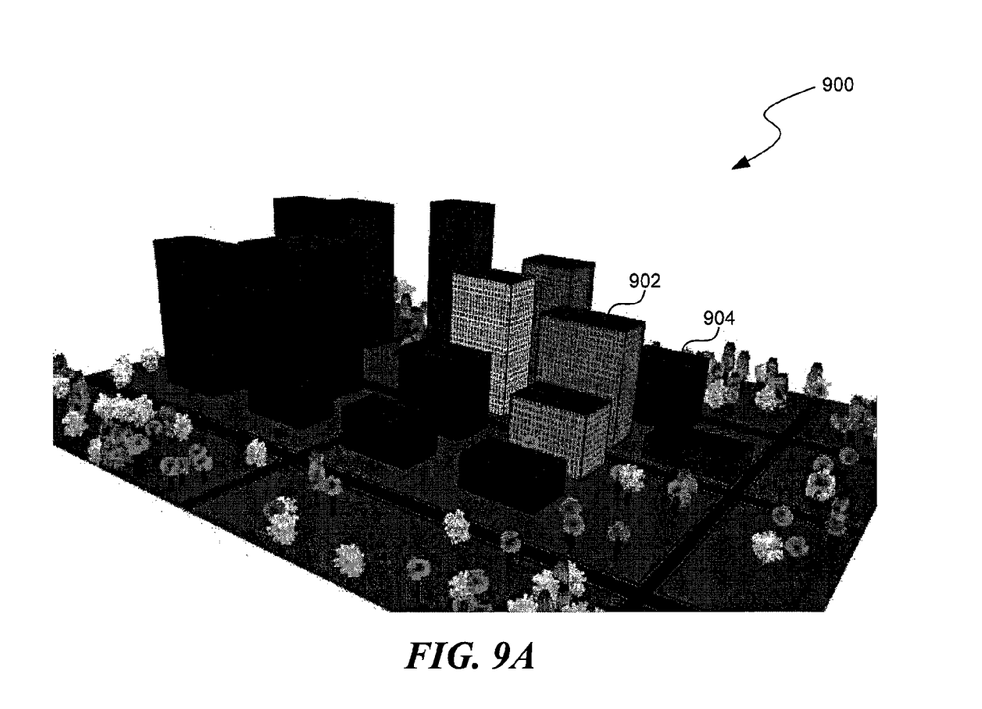
FIGS. 9A and 9B are image diagrams illustrating application of scaling functional dynamics in some embodiments.
Figure 9B:
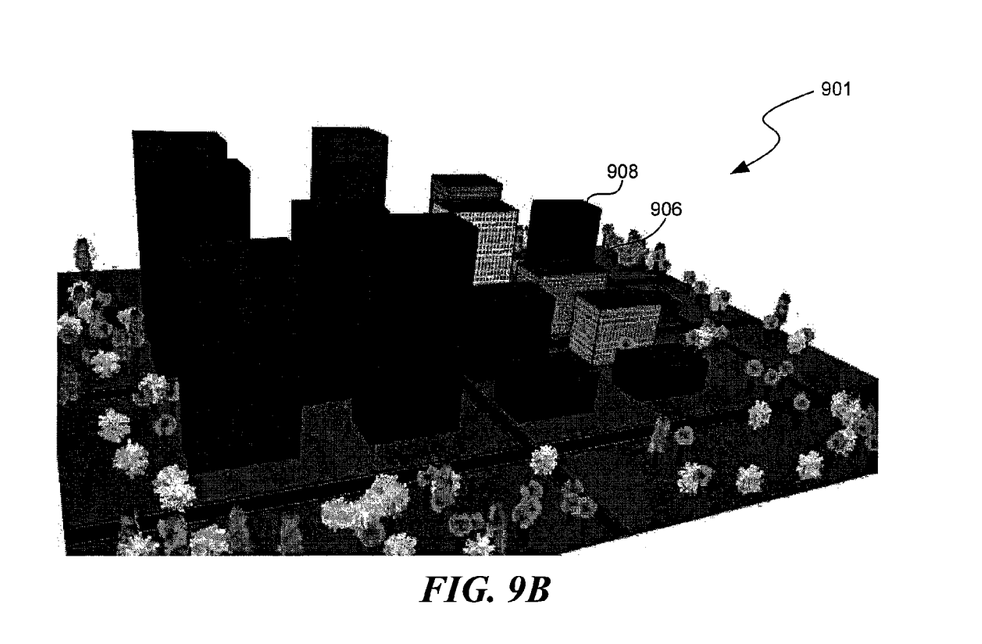

FIGS. 9A and 9B are image diagrams illustrating application of scaling functional dynamics in some embodiments. In FIG. 9A, a view 900 displays building 902 as taller than, and in front of, building 904. When the viewpoint changes to view 901 of FIG. 9B, building 904 would be occluded. However, the occlusion reduction system can scale the heights of buildings 902 and 904 so that building 902 is made shorter and building 904 is made taller. These are evident as building 906 and 908, respectively. These height changes make building 904 visible. Otherwise, it would have been occluded by building 902.

The techniques described herein can be applied to various fields. As examples, the techniques can be employed to visualize functionality associated objects, such as to evaluate cost of floor space per floor in a building, population density within a small geographical region, such as a building, etc. The occlusion reduction system can provide such visualizations by changing colors, transparencies, etc., to highlight buildings, floors, or other attributes of objects that satisfy various constraints a user can specify. As an example, an animation can display each frame without clutter by applying the techniques.

The techniques described herein can also be applied to visualize complex structures within buildings, such as factories, power plants, and manufacturing facilities. As an example, the techniques can be employed to quickly visualize the relative positions of machinery or other objects within these buildings. The techniques can be applied with animation.

In some embodiments, the occlusion reduction system includes a transformation component that receives modeling information and a selection of a viewpoint, and transforms the modeling information into viewing information that identifies a subset of a group of objects that are to be displayed. The occlusion reduction system can then apply the functional dynamics techniques on this subset of the group of objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system having a processor and memory for reducing occlusions when displaying multiple objects, comprising:
creating a geometric model based on modeling information, the created geometric model identifying at least two objects;
receiving a selection of a viewpoint, the viewpoint establishing a perspective from which the geometric model is to be displayed;
identifying from the created geometric model a set of objects for analysis;
analyzing by the processor the identified set of objects to compute an occlusion measure, the occlusion measure measuring an extent to which all of the objects of the set of objects are occluded, wherein the occlusion measure is computed at least in part by computing an occlusion value for each object in the identified set of objects, wherein the occlusion value for each identified object corresponds to the fraction of the object that is occluded by other objects in the set of objects;
in response to determining that the occlusion measure measuring an extent to which all of the objects of the set of objects are occluded exceeds a threshold occlusion value,
improving visibility of the occluded objects by applying a functional dynamics technique wherein the applied functional dynamics technique causes a portion of an occluded object to remain occluded; and
in response to determining that objects are occluded and that the occlusion measure measuring an extent to which all of the objects of the set of objects are occluded does not exceed the threshold occlusion value, not improving visibility of the occluded objects.

2. The method of claim 1 wherein the functional dynamics technique comprises moving an occluding object to improve the visibility of the occluded objects.

3. The method of claim 2 wherein the moving includes determining constraints specifying an extent to which the occluding object can be moved.

4. The method of claim 3 wherein the occluding object is a building and the extent is a road.

5. The method of claim 1 wherein the functional dynamics technique comprises making an occluding object at least partially transparent to improve the visibility of the occluded objects.

6. The method of claim 5 wherein when a first occluding object at least partially occludes a second occluding object and the first and second occluding objects at least partially occlude an occluded object, the occluded object is displayed as opaque and the first occluding object is displayed with greater transparency than the second occluding object.

7. The method of claim 1 wherein the functional dynamics technique comprises modifying a height of an occluding object to improve the visibility of the occluded objects.

8. The method of claim 1 wherein the functional dynamics technique comprises moving a first occluding object, making a second occluding object at least partially transparent, and modifying a height of a third occluding object.

9. The method of claim 8 wherein at least two of the first, second, or third occluding objects are the same occluding object.

10. A system for reducing occlusions when displaying multiple objects, comprising:
a processor and memory;
a set of modeling information that describes a geometric model of a group of objects that can be displayed;
a transformation component that receives the set of modeling information and a selection of a viewpoint, the viewpoint establishing a perspective from which the geometric model is to be displayed, and transforms the modeling information into viewing information that identifies a subset of the group of objects that are to be displayed; and
a functional dynamics component that
computes an occlusion index that measures an extent to which all of the objects of the group of objects are occluded by occluding objects at least in part by,
for each object of the set of objects,
selecting the object, and
setting an occlusion value for the selected object, the occlusion value for the selected object corresponding to the fraction of the selected object that is occluded by objects of the set of objects other than the selected object, and
summing the occlusion values calculated for each of the objects,
determines whether the occlusion index that measures an extent to which all of the objects of the group of objects are occluded by occluding objects exceeds a threshold occlusion value, and
in response to determining that the occlusion index that measures an extent to which all of the objects of the group of objects are occluded by occluding objects exceeds the threshold occlusion value, improves visibility of the occluded objects by applying a functional dynamics technique wherein the applied functional dynamics technique causes a portion of an occluded object to remain occluded.

11. The system of claim 10 wherein the functional dynamics component can move an occluding object to improve visibility of an occluded object.

12. The system of claim 10 wherein the functional dynamics component can make an occluding object at least partially transparent to improve visibility of an occluded object wherein a level of transparency is based on a distance from the viewpoint to the occluding object.

13. The system of claim 10 wherein the functional dynamics component can scale an occluding object to improve visibility of an occluded object by performing a non-uniform scaling operation.

14. The system of claim 10 wherein the functional dynamics component computes the occlusion index by analyzing an extent to which each object that is to be displayed is occluded by other objects that are also to be displayed and applies the functional dynamics technique to minimize the computed occlusion index.

15. A computer-readable storage device storing computer-executable instructions that, when executed, cause a computing system to perform operations for reducing occlusions when displaying multiple objects, the operations comprising:
computing an occlusion measure for a set of objects the occlusion measure measuring an extent to which all of the objects of the set of objects are occluded; and
in response to determining that the occlusion measure measuring an extent to which all of the objects of the set of objects are occluded exceeds the threshold occlusion value,
improving visibility of the occluded objects by applying a functional dynamics technique wherein the applied functional dynamics technique causes a portion of an occluded object to remain occluded,
wherein the occlusion measure measuring an extent to which all of the objects of the set of objects are occluded is computed at least in part by:
for a first object in the set of objects, calculating a first occlusion value at least in part by,
determining the fraction of the potentially visible area of the first object that is blocked by a second object in the set of objects different from the first object, and
determining the fraction of the potentially visible area of the first object that is blocked by a third object in the set of objects different from the first and second objects;
for the second object, calculating a second occlusion value at least in part by,
determining the fraction of the potentially visible area of the second object that is blocked by the first object, and
determining the fraction of the potentially visible area of the second object that is blocked by the third object;
for the third object, calculating a third occlusion value at least in part by,
determining the fraction of the potentially visible area of the third object that is blocked by the first object, and
determining the fraction of the potentially visible area of the third object that is blocked by the second object;
adding together the first occlusion value, the second occlusion value, and the third occlusion value.

16. The computer-readable device of claim 15 wherein the functional dynamics technique comprises moving an object.

17. The computer-readable device of claim 15 wherein the functional dynamics technique comprises making an object at least partially transparent.

18. The computer-readable device of claim 15 wherein the functional dynamics technique comprises altering a size of an object.

19. The method of claim 1 wherein the threshold occlusion value is greater than zero percent.

20. The method of claim 1 wherein the threshold occlusion value is at least approximately fifty percent.

21. The method of claim 1 wherein the threshold occlusion value is greater than or equal to fifty percent.

22. The method of claim 1, further comprising:
repeatedly improving visibility of the occluded objects by applying a functional dynamics technique until the occlusion measure measuring an extent to which all of the objects of the set of objects are occluded is less than the threshold occlusion value.

23. The system of claim 10, further comprising:
a component configured to determine a viewpoint with the lowest occlusion index at least in part by computing an occlusion index for each of a plurality of viewpoints wherein the viewpoint with the lowest occlusion index causes the fewest occlusions.

24. The method of claim 3 wherein the constraints specify that the occluding object cannot be moved greater than a specified distance.

25. The method of claim 3 wherein the constraints specify that the occluding object cannot be moved across a street.

26. The method of claim 3 wherein the constraints specify that the occluding object cannot change its position relative to another object.

27. The method of claim 4 wherein the constraints specify that the building cannot change its position relative to the road.

28. The method of claim 3 wherein the constraints specify that if the occluding object is to one side of a first object, the occluding object cannot be moved to another side of the first object.

29. The computer-readable storage device of claim 15 wherein the occlusion measure O measuring an extent to which all of the objects of the set of objects are occluded is computed according to the following formula:

$$O = \Sigma_i O_i,$$

where $$O_i = \Sigma_{j(j \neq i)} BlkFrac_{ij},$$

i and j correspond to objects in the set of objects, $BlkFrac_{ij}$ is the fraction of the potentially visible area of object i that is blocked by object j, and the set of objects includes at least three objects.

* * * * *